United States Patent Office 3,551,431
Patented Dec. 29, 1970

3,551,431
ISONIPECOTONITRILES
Hans Herbert Kühnis and Rolf Denss, Basel, Switzerland, assignors to Geigy Chemical Corporation, Ardsley, N.Y., a corporation of New York
No Drawing. Filed June 24, 1968, Ser. No. 739,194
Claims priority, application Switzerland, Jan. 11, 1968, 420/68
Int. Cl. C07d 29/32
U.S. Cl. 260—293                5 Claims

ABSTRACT OF THE DISCLOSURE

Piperidine derivatives with a cyano group in 4-position and acid addition salts thereof possessing useful antitussive action; therapeutic compositions containing these piperidine derivatives or their pharmaceutically acceptable acid addition salts for producing antitussive effects in warm-blooded animals, particularly mammals. An illustrative embodiment is 1-(2-phenylethyl)isonipecotonitrile.

DETAILED DISCLOSURE

The invention relates to piperidine derivatives of the general Formula I

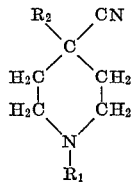

(I)

wherein $R_1$ is phenyl(lower)alkyl with at most 9 carbon atoms, and $R_2$ is allyl or propinyl and their addition salts with inorganic and organic acids, have valuable pharmacological properties, in particular antitussive activity with, at the same time, a favourable therapeutic index.

The antitussive activity of the compounds of general Formula I for instance the hydrochlorides of 1-(2-phenylethyl)-4-allyl isonipecotonitrile, 1-(2-phenylethyl)-4-(2-propinyl)-isonipecotonitrile, 1 - (3-phenylpropyl)-4-allyl isonipecotonitrile and 1-(3-phenylpropyl)-4-(2-propinyl)-isonipecotonitrile, can be demonstrated, e.g., on intravenous administration in the cat by the method according to R. Domenjoz, Arch. exp. Path. und Pharmakol. 215, 19–24 (1952).

Another method for proving the antitussive activity is the determination of the tussive irritation in the guinea pig, caused by sulphur dioxide, by subcutaneous or oral administration of the test substances. In a preliminary test to select test animals, male guinea pigs in a perspex chamber were exposed at atmospheric pressure to an $SO_2/CO_2$/air mixture at a constant ratio of 20 ml.:1.5 litres:10.5 litres per minute until the onset of cough or for a maximum of 120 seconds. The onset of cough was assessed visually. The guinea pigs reacting with cough (about two-thirds of all animals) were put in groups of 6 animals each. About 24 hours after the preliminary test, these groups of test animals received the test substance administered in different doses suitable for ascertaining the E.D.$_{50}$ in mg./kg. subcutaneously or by mouth. Exposure to irritant gas was effected in the same way as in the preliminary test either 30 or 90 minutes after administration of the test substances. The onset of cough was again assessed visually. The dosage preventing onset of cough in 50% of the animals=$ED_{50}$ is obtained by interpolation on the probability graph Schleicher & Schüll 298½ from the percentages of animals no longer reacting to $SO_2$ with different dosages of test substances.

The new piperidine derivatives of general Formula I and their pharmaceutically acceptable acid addition salts are suitable as active substances for pharmaceutical preparations for the treatment of coughs, particularly for the amelioration and relief of tussive irritation. They can be administered orally, rectally or parenterally to warm-blooded animals, particularly mammals.

To produce the new piperidine derivatives of the general Formula I and their acid addition salts, an amide of the general Formula II

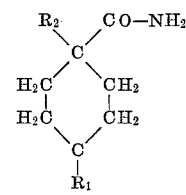

(II)

wherein $R_1$ and $R_2$ have the meanings given in Formula I, is reacted with an agent spliting off water and, if desired, the compound obtained of the general Formula I is converted into an addition salt with an inorganic or organic acid. Thinoyl chloride, phosphorus trichloride and phosphorus pentoxide are mentioned as examples of agents which split off water. The water is split off, e.g., by boiling an amide of the general Formula II with thionyl chloride in benzene or chloroform or by heating with phosphorus pentoxide, preferably at temperatures between 140° and 200°, or by heating with phosphorus trichloride.

Starting materials of the general Formula II are obtained, e.g. by reacting the isonipecotamide with reactive esters of compounds of the general Formula III, $$R_1\text{—OH} \quad \text{(III)}$$

The following examples illustrate specific embodiments and further by condensation with allyl or (2-propinyl) halides with potassium amide in liquid ammonia.

According to a second process, compounds of the general Formula I and their addition salts with inorganic and organic acids, are produced by reacting an alkali metal compound of an isonipecotonitrile of the general Formula IV

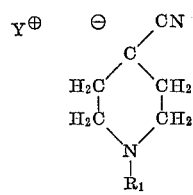

(IV)

wherein $Y^\oplus$ represents an alkali metal ion, particularly lithium ion and $R_1$ has the meaning given in Formula I, in an inert organic solvent with a reactive ester of allyl alcohol or 2-propin-1-ol and, if desired, converting the compound obtained of general Formula I into an addition salt with an inorganic or organic acid.

As reactive esters of the allyl alcohol or 2-propin-1-ol, particularly the halides such as the bromide, iodide and chloride, also alkane and arene sulphonic acid esters such as methane or p-toluene sulphonic acid esters, are used.

A mixture of abs. diethyl ether or tetrahydrofuran with 1,2-dimethoxyethane (ethylene glycol dimethyl ether) is suitable as reaction medium for the main reaction. The alkali metal compounds of general Formula IV are produced in situ from other suitable alkali metal compounds. Triphenylmethyl lithium which is particularly suitable as such, is also preferably formed in situ from another organic lithium compound such as phenyl lithium, for example, by adding a solution of triphenylmethane in 1,2-dimethoxyethane to the phenyl lithium produced in the known way, which is present in diethyl ether. As the triphenylmethyl lithium produces intensively coloured solutions, its formation as well as its use can be easily followed by the isonipecotonitrile which is subsequently added. Also triphenylmethyl sodium or potassium, for example, can be useful instead of triphenylmethyl lithium. The steps in the processes according to the invention are generally slightly exothermic and can be performed at room temperature or slightly raised temperature. If necessary, the reaction mixture must also be able to be cooled depending on the starting materials and amounts thereof used.

In addition, compounds of general Formula I wherein $R_2$ is the allyl group, and their addition salts with inorganic and organic acids, are produced by a third process by treating a compound of the restricted general Formula V

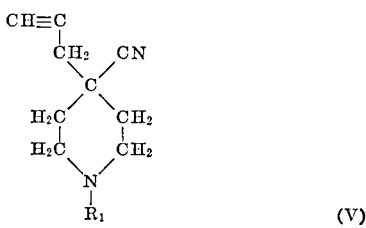

which is already embraced by general Formula I and in which $R_1$ has the meaning given in Formula I, with hydrogen until the equimolar amount has been taken up, in the presence of a catalyst suitable for the partial hydrogenation of triple bonds. As catalyst, e.g., palladium on $CaCO_3$, partially deactivated with lead acetate, in ethanol as solvent and further deactivated in situ by the addition of quinoline (Lindlar catalyst, cf. Helv. Chim. Acta 35, 450 (1952)), is used. If desired, the compound obtained of general Formula I is converted into an addition salt with an inorganic or organic acid. If desired, the piperidine derivatives of the general Formula I obtained by the processes according to the invention are then converted into their addition salts with inorganic and organic acids in the usual way. For example, the acid desired as salt component or a solution thereof is added to a solution of a piperidine derivative of the general Formula I in an organic solvent such as diethyl ether, methanol or ethanol, and the salt which precipitates either direct or after addition of a second organic liquid, e.g. diethyl ether to methanol, is isolated.

For use as active substances in therapeutic compositions, pharmaceutically acceptable acid addition salts can be used instead of free bases, i.e. salts with those acids the anions of which have no pharmacological action or which in themselves have a desired pharmacological action. In addition, it is of advantage if the salts to be used as active substances crystallise well and are not or are only slightly hygroscopic. Hydrochloric acid, hydrobromic acid, sulphuric acid, phosphoric acid, methane sulphonic acid, ethane sulphonic acid, β-hydroxy-ethane sulphonic acid, acetic acid, malic acid, tartaric acid, citric acid, lactic acid, succinic acid, fumaric acid, maleic acid, benzoic acid, salicyclic acid, phenylacetic acid, mandelic acid, embonic acid, or 1,5-naphthalene disulphonic acid, for example, can be used for salt formation with piperidine derivatives of the general Formula I.

The new piperidine derivatives of the general Formula I and their salts may be administered orally, rectally or parenterally. The daily dosages of free bases or of pharmaceutically acceptable salts thereof vary between about 0.02 mg./kg. and about 10 mg./kg., preferably about 0.05 mg./kg. to about 5.0 mg./kg. for mammals, depending on the mammal and condition. Suitable dosage units such as dragées (sugar-coated tablets), capsules, tablets, suppositories or ampoules, preferably contain 1–100 mg. of piperidine derivative of the general Formula I or of a pharmaceutically acceptable salt thereof.

Dosage units for oral administration preferably contain between 1% and 90% of a piperidine derivative of general Formula I or of a pharmaceutically acceptable salt thereof as active substance. They are produced by combining the active substance with, e.g., solid, pulverulent carriers such as lactose sucrose, sorbitol, mannitol; starches such as potato starch, maize starch or amylopectin, also laminaria powder or citrus pulp powder; cellulose derivatives or gelatine, optionally with the addition of lubricants, such as magnesium or calcium stearate or polyethylene glycols, to form tablets or dragée cores. The latter are coated, e.g., with concentrated sugar solutions which can also contain, e.g., gum arabic, talcum and/or titanium dioxide, or with a lacquer dissolved in easily volatile organic solvents or mixtures of solvents. Dyestuffs can be added to these coatings, e.g. to distinguish between varying dosages of active substance. Other suitable dosage units for oral administration are hard gelatine capsules and also soft, closed capsules made of gelatine and a softener such as glycerin. The former preferably contain the active substance as a granulate in admixture with lubricants such as talcum or magnesium stearate and, optionally, stabilisers such as sodium metabisulphite or ascorbic acid. In soft capsules, the active substance is preferably dissolved or suspended in suitable liquids such as liquid polyethylene glycols to which stabilisers can also be added.

Also, for the treatment of coughs, e.g., lozenges as well as forms not made up into single dosages can be used for oral administration, e.g., cough syrups or drops prepared with the usual auxiliaries.

Dosage units for rectal administration are, e.g., suppositories which consist of a combination of a piperidine derivative of the general Formula I or a suitable salt thereof with a neutral fatty foundation, or also gelatine rectal capsules which contain a combination of the active substance with polyethylene glycols.

Ampoules for parenteral, particularly intramuscular, also intravenous, administration preferably contain a water-soluble salt of a piperidine derivative of the general Formula I as active substance in a concentration of, preferably, 0.5–5%, in aqueous solution, optionally together with suitable stabilisers and buffer substances.

The following prescriptions further illustrate the production of forms for administration according to the invention:

(a) 10 g. of active substance, 3 g. 1-(2-phenylethyl)-4-allyl isonipecotonitrile hydrochloride, 30 g. of lactose and 5 g. of highly dispersed silicic acid are mixed, the mixture is moistened with a solution of 5 g. of gelatine and 7.5 g. of glycerin in distilled water and granulated through a sieve. The granulate is dried, sieved and carefully mixed with 3.5 g. of potato starch, 3.5 g. of talcum and 0.5 g. of magnesium stearate. The mixture is compressed into 1,000 tablets each weighing 65 mg. and containing 10 mg. of active substance.

(b) 5 g. of active substance, e.g. 1-(2-phenylethyl)-4-(2-propinyl)-isonipecotonitrile hydrochloride, 15 g. of lactose and 20 g. of starch are mixed. The mixture is moistened with a solution of 5 g. of gelatine and 7.5 g. of glycerin in distilled water and granulated through a sieve. The granulate is dried, sieved and carefully mixed with 3.5 g. of talcum and 0.5 g. of magnesium stearate. The mixture is compressed into 1,000 dragée cores. These are then coated with a concentrated syrup made from 26.66 g. of crystallised sucrose, 17.5 g. of talcum, 1 g. of shellac, 3.75 g. of gum arabic, 1 g. of highly dispersed silicic acid and 0.090 g. of dyestuff, and dried. The dragées obtained each weigh 110 mg. and contain 5 mg. of active substance.

(c) 1,000 capsules each containing 10 mg. of active substance are produced as follows: 10 g. of 1-(2-phenylethyl)-4-allyl isonipecotonitrile hydrochloride are mixed with 263 g. of lactose. The mixture is evenly moistened with an aqueous solution of 2 g. of gelatine and granulated through a suitable sieve (e.g. sieve III, Ph. Helv. V). The granulate is mixed with 10 g. of dried maize starch and 15 g. of talcum and is then evenly filled into 1,000 hard gelatine capsules, size 1.

(d) A cough syrup containing 0.5% active substance is prepared as follows: 1.5 litres of glycerin, 42 g. of p-hydroxybenzoic acid methyl ester, 18 g. of p-hydroxybenzoic acid n-propyl ester and, while slightly warming, 50 g. of 1-(2-phenylethyl)-4-allyl isonipecotonitrile hydrochloride are dissolved in 3 litres of distilled water. 4 litres of 70% sorbitol solution, 1,000 g. of crystallised sucrose, 350 g. of glucose and a flavouring, e.g. 250 g. of "Orange Peel Soluble Fluid" produced by Ely Lilly & Co., Indianapolis, or 5 g. of natural lemon flavouring and 5 g. of "Halb und Halb" essence, both produced by Haarmann und Reimer, Holzminden, Germany, are added. The solution obtained is filtered and the filtrate is made up to 10 litres with distilled water.

(e) A cough syrup containing 0.25% of active substance is produced as follows: 25 g. of 1-(2-phenylethyl)-4-allyl isonipecotonitrile hydrochloride is dissolved by warming in a mixture of 2.5 litres of water, and 0.5 litre of 96% ethanol. Also, a syrup is made from 30 litres of water, 1 litre of 70% sorbitol solution, 3,000 g. of crystallised sucrose, 42 g. of p-hydroxybenzoic acid methyl ester and 18 g. of p-hydroxybenzoic acid n-propyl ester, and this syrup is carefully mixed with the solution of active substance. After the addition of flavourings, e.g. those mentioned under (d) and, if necessary, filtration, the syrup obtained is made up to 10 litres with distilled water.

(f) For the treatment of coughs, drops containing 2.5% of active substance are prepared by dissolving 250 g. of 1-(2-phenylethyl)-4-allyl isonipecotonitrile hydrochloride and 30 g. of sodium cyclamate in a mixture of 4 litres of 96% ethanol and 1 litre of propylene glycol. Also, 3.5 litres of 70% sorbitol solution are mixed with 1 litre of water and this mixture is added to the above solution of active substance. A flavouring, e.g. 5 g. of cough-drop aroma or 30 g. of grapefruit essence, both produced by Haarmann and Reimer, Holzminden, Germany, is added and the whole is well mixed, filtered and made up to 10 litres with distilled water.

(g) A mass for suppositories is made from 2.5 g. of 1-(2-phenylethyl)-4-allyl isonipecotonitrile hydrochloride and 167.5 g. of Adeps solidus and 100 suppositories are filled therewith. Each contain 25 mg. of active substance.

(h) 2 g. of 1-(2-phenylethyl)-4-allyl isonipecotonitrile hydrochloride and 2.2 g. of glycerin are dissolved in distilled water up to 100 ml. and the solution is filled into 100 ampoules. Each contains 1 ml. and 20 mg. of active substance.

The following examples illustrate the production of the new compounds of general Formula I but in no way limit the scope of the invention. The temperatures are given in degrees centigrade.

EXAMPLE 1

30 ml. of thionyl chloride are carefully added to a solution of 25.4 g. 1-(2-phenylethyl)-4-allyl isonipecotinic acid amide in 75 ml. of chloroform. An exothermic reaction takes place. The reaction mixture is then refluxed for 5 hours. The chloroform and thionyl chloride are then evaporated off in vacuo, the residue is decomposed with water while cooling, made alkaline with concentrated ammonia and is extracted several times with ether. The combined ether extracts are dried and concentrated. The residue is distilled. The 1-(2-phenylethyl)-4-allyl isonipecotonitrile boils at 126–139°/0.2 torr. The hydrochloride prepared with hydrogen chloride melts at 293–294° when recrystallised from methanol.

EXAMPLE 2

4.5 g. of bromobenzene in 60 ml. of abs. ether are placed in a 200 ml. four-necked flask and, while stirring under an atmosphere of nitrogen, 0.40 g. of lithium wire cut into small pieces are added whereupon the ether begins to boil. After the reaction has subsided the mixture is refluxed for another 2½ hours. 6.35 g. of triphenylmethane in 25 ml. of abs. 1,2-di-methoxyethane are added all at once to the solution of phenyl lithium obtained whereupon, due to the formation of triphenylmethyl lithium, the solution turns deep red and gently boils. After stirring for 20 minutes at room temperature, 5.5 g. of 1-(2-phenylethyl)-isonipecotonitrile in 5 ml. of abs. ether are added at 28°. The solution loses its deep red colour and the temperature slightly rises. It is stirred for 10 minutes at room temperature and then 3.4 g. of allyl bromide in 20 ml. of abs. ether are added all at once. The mixture is stirred for 2½ hours at room temperature whereupon it turns yellowish and lithium bromide precipitates. 20 ml. of water are then added to the reaction mixture which is then evaporated in a rotary evaporator. Ether is added to the residue and the ether solution obtained is extracted four times with dilute hydrochloric acid. The acid extracts are made alkaline and exhaustively extracted with chloroform. The chloroform extracts are dried and concentrated. The residue is taken up in ether, the ether solution is dried and concentrated and the residue is distilled. The 1-(2 - phenylethyl)-4-allyl isonipecotonitrile boils at 126–139°/0.2 torr. The hydrochloride prepared with hydrogen chloride in ether melts, after recrystallisation from methanol, at M.P. 293–294°.

On using the corresponding 1-substituted isonipecotonitrile, the following compound is obtained analogously: 1-(3-phenylpropyl)-4-allyl isonipecotonitrile, hydrochloride 219–220°.

The starting material is produced as follows:

(a) 35.0 g. of isonipecotinic acid amide, 2-phenylethyl bromide, 46.0 g. of sodium carbonate and 0.3 g. of sodium iodide and 200 ml. of diethyl ketone are refluxed for 4 hours. The reaction mixture is then filtered under suction and the residue is washed several times with hot acetone. The whole filtrate is evaporated in vacuo and the crystalline residue is recrystallised from ethanol/methanol. The 1-(2-phenylethyl)-isonipecotinic acid amide so obtained melts at 178–179°.

(b) 19.8 g. of 1-(2-phenylethyl)-isonipecotinic acid amide are dissolved in 75 ml. of chloroform and, in all, 50 ml. of thionyl chloride are carefully added to the solution, whereupon the temperature of the solution rises. It is then refluxed for 5 hours, after which chloroform and thionyl chloride are evaporated in vacuo, the residue is decomposed with an alkaline reaction with concentrated ammonia while cooling with water and it is extracted several times with ether. The combined ether extracts are dried and concentrated and the residue is distilled. The 1-(2-phenylethyl)-isonipecotonitrile passes over at 124–129° under 0.01 torr. The hydrochloride prepared with ethereal hydrogen chloride solution melts at 216–218°.

The following is produced in an analogous way: 1-(3-phenylpropyl) - isonipecotonitrile, B.P. 138–139°/0.07 torr, hydrochloride M.P. 177–178°.

EXAMPLE 3

5.5 g. of bromobenzene in 50 ml. of abs. ether are placed in a 200 ml. four-necked flask and, while stirring under an atmosphere of nitrogen, 0.49 g. of lithium wire which has been cut into small pieces and washed with petroleum ether, are added whereupon the ether begins to boil. After the reaction has subsided, the mixture is refluxed for another 2½ hours. 7.6 g. of triphenylmethane in 25 ml. of abs. 1,2-dimethoxyethane are added all at once to the solution of phenyl lithium obtained whereupon, due to the formation of triphenylmethyl lithium, the solution becomes deep red coloured and gently boils.

After stirring for 20 minutes at room temperature, 6.4 g. of 1-(2-phenylethyl)-isonipecotonitrile (cf. Example 1) in 5 ml. of abs. ether are added ot 28°. The temperature slightly rises and the solution loses its deep red colour. It is stirred for 10 minutes at room temperature and then 4.0 g. of propargyl bromide (3-bromopropine) in 20 ml. of abs. ether are added all at once. The mixture is stirred for 2½ hours at room temperature whereupon it turns yellowish and lithium bromide precipitates. 20 ml. of water are then added to the reaction mixture and it is evaporated in a rotary evaporator. Ether is added to the residue and the ether solution obtained is extracted four times with dilute hydrochloric acid. The acid extracts are made alkaline ond exhaustively extracted with chloroform. The chloroform extracts are dried and evaporated. The residue is taken up in ether, the ether solution is dried and concentrated and the residue is distilled. The 1-(2-phenylethyl)-4(2-propinyl)-isonipecotonitrile passes over at 141–170°/0.05 torr.

The hydrochloride is produced therefrom in ether and recrystallised from isopropanol/methanol. The 1-(2-phenylethyl)-4-(2-propinyl) - isonipecotonitrile hydrochloride obtained melts at 258–259°.

On using the corresponding 1-substituted isonipecotonitrile, the following compound is obtained analogously: 1 - (3 - phenylpropyl) - 4 - (2-propinyl)-isonipecotonitrile, B.P. 140–170°/0.04 torr (airbath), hydrochloride 208–210°.

EXAMPLE 4

A solution of 2.52 g. of 1-(2-phenylethyl)-4-(2-propinyl)-isonipecotonitrile in 50 ml. of ethanol is hydrogenated at room temperature under normal pressure in the presence of 0.5 g. of Lindlar catalyst (palladium on calcium carbonate, partially deactivated with lead acetate) and 0.2 g. of quinoline. After about 107% of the theoretically necessary amount of hydrogen has been taken up, the hydrogenation is discontinued, the catalyst is filtered off and thoroughly washed with ethanol. The filtrate is evaporated in a rotary evaporator and the residue is distilled under high vacuum. The 1-(2-phenylethyl)-4-allyl isonipecotonitrile obtained boils at 126–139°/0.2 torr. The hydrochloride prepared with hydrogen chloride is recrystallised from methanol whereupon it melts at 293–294°.

What is claimed is:
1. A compound of the formula

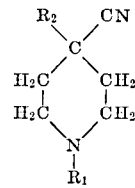

wherein
$R_1$ is phenyl(lower)alkyl with at most 9 carbon atoms; and
$R_2$ is allyl or propinyl
or a pharmaceutically acceptable acid addition salt thereof.

2. A compound as defined in claim 1 wherein said compound is 1-(2-phenylethyl)-4-allyl isonipecotonitrile.

3. A compound as defined in claim 1 wherein said compound is 1-(3-phenylpropyl)-4-allyl isonipecotonitrile.

4. A compound as defined in claim 1 wherein said compound is 1-(2-phenylethyl)-4-(2-propinyl) isonipecotonitrile.

5. A compound as defined in claim 1 wherein said compound is 1-(3-phenylpropyl)-4-(2-propinyl) isonipecotonitrile.

References Cited

UNITED STATES PATENTS 3,338,910   8/1967   Kühnis et al. _____ 260—294.3

HENRY R. JILES, Primary Examiner

G. T. TODD, Assistant Examiner

U.S. Cl. X.R.

260—293.4, 294; 424—267